United States Patent
Li et al.

(10) Patent No.: US 8,056,703 B2
(45) Date of Patent: *Nov. 15, 2011

(54) CONTAINER, SUCH AS A FOOD OR BEVERAGE CONTAINER, LUBRICATION METHOD

(75) Inventors: Minyu Li, Oakdale, MN (US); Keith D. Lokkesmoe, Savage, MN (US); Guang-Jong Jason Wei, Mendota Heights, MN (US)

(73) Assignee: Ecolab USA Inc., St. Paul, MN (US)

( * ) Notice: Subject to any disclaimer, the term of this patent is extended or adjusted under 35 U.S.C. 154(b) by 68 days.

This patent is subject to a terminal disclaimer.

(21) Appl. No.: 12/553,563

(22) Filed: Sep. 3, 2009

(65) Prior Publication Data

US 2009/0321222 A1    Dec. 31, 2009

Related U.S. Application Data

(63) Continuation of application No. 12/108,657, filed on Apr. 24, 2008, now Pat. No. 7,600,631, which is a continuation of application No. 10/639,613, filed on Aug. 11, 2003, now Pat. No. 7,364,033, which is a continuation of application No. 10/190,235, filed on Jul. 3, 2002, now Pat. No. 6,780,823, which is a continuation of application No. 09/595,835, filed on Jun. 16, 2000, now Pat. No. 6,427,826, which is a continuation-in-part of application No. 09/441,881, filed on Nov. 17, 1999, now Pat. No. 6,288,012.

(51) Int. Cl.
    *B65G 45/02*    (2006.01)
(52) U.S. Cl. .................. 198/500; 508/208
(58) Field of Classification Search ............. 198/493, 198/500
    See application file for complete search history.

(56) References Cited

U.S. PATENT DOCUMENTS

| | | | |
|---|---|---|---|
| 3,853,607 A | 12/1974 | Iyengar et al. | |
| 4,069,933 A | 1/1978 | Newing | |
| 4,262,776 A | 4/1981 | Wilson et al. | |
| 4,478,889 A | 10/1984 | Maruhashi et al. | |
| 4,486,378 A | 12/1984 | Hirata et al. | |
| 4,515,836 A | 5/1985 | Cobbs, Jr. et al. | |
| 4,525,377 A | 6/1985 | Nickel et al. | |
| 4,534,995 A | 8/1985 | Pocock et al. | |
| 4,538,542 A | 9/1985 | Kennon et al. | |

(Continued)

FOREIGN PATENT DOCUMENTS

CA    2381345    3/2001

(Continued)

OTHER PUBLICATIONS

U.S. Appl. No. 09/655,740, filed Sep. 6, 2000, Küpper et al.

(Continued)

*Primary Examiner* — Gene Crawford
*Assistant Examiner* — William R Harp
(74) *Attorney, Agent, or Firm* — Andrew D. Sorensen; Laura C. Dilorenzo; Amy J. Hoffman

(57) ABSTRACT

A process for lubricating a container, such as a beverage container, or a conveyor for containers, by applying to the container or conveyor, a thin continuous, substantially non-dripping layer of a liquid lubricant. The process provides many advantages compared to the use of a conventional dilute aqueous lubricant.

32 Claims, 1 Drawing Sheet

U.S. PATENT DOCUMENTS

| | | | |
|---|---|---|---|
| 4,543,909 | A | 10/1985 | Sharpless |
| 4,569,869 | A | 2/1986 | Kushida et al. |
| 4,573,429 | A | 3/1986 | Cobbs, Jr. et al. |
| 4,627,457 | A | 12/1986 | Bird et al. |
| 4,632,053 | A | 12/1986 | Villanueva et al. |
| 4,690,299 | A | 9/1987 | Cannon |
| 4,713,266 | A | 12/1987 | Hasegawa et al. |
| 4,714,580 | A | 12/1987 | Maruhashi et al. |
| 4,851,287 | A | 7/1989 | Hartsing, Jr. |
| 4,874,647 | A | 10/1989 | Yatsu et al. |
| 4,919,984 | A | 4/1990 | Maruhashi et al. |
| 4,980,211 | A | 12/1990 | Kushida et al. |
| 5,001,935 | A | 3/1991 | Tekkanat et al. |
| 5,115,047 | A | 5/1992 | Hashimoto et al. |
| 5,238,718 | A | 8/1993 | Yano et al. |
| 5,320,132 | A | 6/1994 | Weisse |
| 5,334,322 | A | 8/1994 | Williams, Jr. |
| RE34,742 | E | 9/1994 | Maier et al. |
| 5,352,376 | A | 10/1994 | Gutzmann |
| 5,371,112 | A | 12/1994 | Sayre et al. |
| 5,391,308 | A | 2/1995 | Despo |
| 5,509,965 | A | 4/1996 | Harry et al. |
| 5,565,127 | A | 10/1996 | Laufenberg et al. |
| 5,573,819 | A | 11/1996 | Nugent, Jr. et al. |
| 5,652,034 | A | 7/1997 | Seiner |
| 5,658,619 | A | 8/1997 | Kirschner et al. |
| 5,663,131 | A | 9/1997 | Winicov et al. |
| 5,681,628 | A | 10/1997 | Niederst et al. |
| 5,698,269 | A | 12/1997 | Carlblom et al. |
| 5,721,023 | A | 2/1998 | Ostapchenko |
| 5,728,770 | A | 3/1998 | Yamamoto et al. |
| 5,783,303 | A | 7/1998 | Tsuei |
| 5,789,459 | A | 8/1998 | Inagaki et al. |
| 5,876,812 | A | 3/1999 | Frisk et al. |
| 6,207,622 | B1 | 3/2001 | Li et al. |
| 6,214,777 | B1 | 4/2001 | Li et al. |
| 6,288,012 | B1 | 9/2001 | Li et al. |
| 6,372,698 | B1 | 4/2002 | Strothoff et al. |
| 6,427,826 | B1 | 8/2002 | Li et al. |
| 6,475,961 | B2 | 11/2002 | Lokkesmoe et al. |
| 6,495,494 | B1 | 12/2002 | Li et al. |
| 6,509,302 | B2 | 1/2003 | Li et al. |
| 6,576,298 | B2 | 6/2003 | Li et al. |
| 6,653,263 | B1 | 11/2003 | Küpper et al. |
| 6,673,753 | B2 | 1/2004 | Hei et al. |
| 6,677,280 | B2 | 1/2004 | Küpper et al. |
| 6,780,823 | B2 | 8/2004 | Li et al. |
| 6,806,240 | B1 | 10/2004 | Hei et al. |
| 6,809,068 | B1 | 10/2004 | Küpper et al. |
| 7,364,033 | B2 | 4/2008 | Li et al. |
| 7,600,631 | B2 * | 10/2009 | Li et al. .......................... 198/500 |
| 2004/0058829 | A1 | 3/2004 | Hei et al. |

FOREIGN PATENT DOCUMENTS

| | | |
|---|---|---|
| JP | SHO57-3892 | 1/1982 |
| WO | WO93/18120 | 9/1993 |

OTHER PUBLICATIONS

Du Pont Krytox® Brochure, "Krytox® Dry Film Lubricants", pp. 1-6 (Nov. 1997).

Interflon®, http://www.interflon.nl/engels, htm, last updated Jun. 18, 1999, pp. 1-10.

Moskala, E., "Environmental Stress Cracking in PET Beverage Containers", pp. 8-1-8-15 (1996).

Moskala, E., "Environmental Stress Cracking in PET Carbonated Soft Drink Containers", pp. 51-70 (1998).

Synco Chemical Corporation, http://www.super-tube.com, last updated May 5, 1999, 5 pgs.

Tekkanat, B. et al., "Environmental Stress Cracking Resistance of Blow Molded Poly(Ethylene Terephthalate) Containers", *Polymer Engineering and Science*, vol. 32, No. 6, pp. 393-394 (Mar. 1992).

Encyclopedia of Chemical Technology, Fourth Edition, "Flavor Characterization to Fuel Cells," John Wiley & Sons, vol. 11, pp. 621-644 (Date Unknown—published before Jul. 7, 2003).

Interflon, "Find Food Lube AI" Brochure, 20 pp (date Unknown—published before Jul. 7, 2003).

* cited by examiner

CONTAINER, SUCH AS A FOOD OR BEVERAGE CONTAINER, LUBRICATION METHOD

CROSS-REFERENCE TO RELATED APPLICATION

This application is a continuation of U.S. patent application Ser. No. 12/108,657, filed Apr. 24, 2008, issued as U.S. Pat. No. 7,600,631, which is a continuation of U.S. patent application Ser. No. 10/639,613, filed Aug. 11, 2003, now U.S. Pat. No. 7,364,033 which is a continuation of U.S. patent application Ser. No. 10/190,235 filed on Jul. 3, 2002, now U.S. Pat. No. 6,780,823. U.S. patent application Ser. No. 10/190,235 is a continuation of U.S. patent application Ser. No. 09/595,835, filed on Jun. 16, 2002, now U.S. Pat. No. 6,427,826. U.S. patent application Ser. No. 09/595,835 is a continuation-in-part of U.S. patent application Ser. No. 09/441,881, filed Nov. 17, 1999, now U.S. Pat. No. 6,288,012.

The entire contents of each of these patent applications are hereby expressly incorporated herein by reference including, without limitation, the specification, claims and abstract, as well as any figures, tables, or drawings thereof.

FIELD OF THE INVENTION

The invention relates to conveyor lubricants and lubricant compositions, and to methods of use, for example, to treat or lubricate a container(s) and conveyor surfaces or system for containers. The invention also relates to containers and conveyor surface or system treated with a lubricant or lubricant composition. The container is, for example, a food or beverage container.

DESCRIPTION OF RELATED ART

Containers are receptacles in which materials are or will be held or carried. Containers are commonly used in the food or beverage industry to hold food or beverages. Often lubricants are used in conveying systems for containers, to ensure the appropriate movement of containers on the conveyor.

In the commercial distribution of many products, including most beverages, the products are packaged in containers of varying sizes. The containers can be made of paper, metal or plastic, in the form of cartons, cans, bottles, Tetra Pak™ packages, waxed carton packs, and other forms of containers. In most packaging operations, the containers are moved along conveying systems, usually in an upright position, with the opening of the container facing vertically up or down. The containers are moved from station to station, where various operations, such as filling, capping, labeling, sealing, and the like, are performed.

Containers, in addition to their many possible formats and constructions, may comprise many different types of materials, such as metals, glasses, ceramics, papers, treated papers, waxed papers, composites, layered structures, and polymeric materials. Any desired polymeric material can be used, such as polyolefins, including polyethylene, polypropylene, polystyrene, and mixtures thereof, polyesters such as polyethylene terephthalate (PET or PETE) and polyethylene naphthalate (PEN) and mixtures thereof, polyamides, polycarbonates, and the like.

Lubricating solutions are often used on conveying systems during the filling of containers with, for example, beverages. There are a number of different requirements that are desirable for such lubricants. For example, the lubricant should provide an acceptable level of lubricity for the system. It is also desirable that the lubricant have a viscosity which allows it to be applied by conventional pumping and/or application apparatus, such as by spraying, roll coating, wet bed coating, and the like, commonly used in the industry.

In the beverage industry, it is also important that the lubricant be compatible with the beverage so that it does not form solid deposits when it accidentally contacts spilled beverages on the conveyor system. This is important since the formation of deposits on the conveyor system may change the lubricity of the system and could require shutdown of the equipment to facilitate cleaning.

It is also important that the lubricant can be cleaned easily. The container and/or the conveyor system may need to be cleaned. Since water is often in the cleaning solution, ideally the lubricant has some water-soluble properties.

Currently, containers, including polyethylene terephthalate (PET) bottles, and conveying systems for containers are often contacted with a volume of a dilute aqueous lubricant to provide lubricity to the container so that it can more easily travel down the conveyor system. Many currently used aqueous-based lubricants are disadvantageous because they are incompatible with many beverage containers, such as PET and other polyalkylene terephthalate containers, and may promote stress cracking of the PET bottles.

Furthermore, aqueous based lubricants are in general often disadvantageous because of the large amounts of water used, the need to use a wet work environment, the increased microbial growth associated with such water-based systems, and their high coefficient of friction. Moreover, most aqueous-based lubricants are incompatible with beverages.

Flooding a conveyor surface with a substantial proportion of aqueous lubricant typically occurs on food container filling or beverage bottling lines. Sufficient lubricant is used such that the lubricant is not retained entirely by the surface of the conveyor but tends to flow from the surface of the container, drip onto a conveyor support members and the surrounding environmental area around the conveyors. Further, sufficient amounts of lubricant are applied to the conveyor and other mechanisms of the plant under such conditions that a substantial foam layer of lubricant can form on the surface of the conveyor. As much as one inch (about 2.5 cm or more) thick of lubricant foam can contact a substantial portion of the base of a food container such as polyethylene terephthalate beverage bottle. We have found that current methods of lubricating such containers are wasteful of the lubricant material since a substantial proportion of the materials is lost as it leaves the container surface. Further, substantial proportions of the lubricant remain on the container and are carried from the conveyor as the food packaging or beverage-bottling operations are continued. A substantial need exists for approved methods that waste little or no lubricant during packaging or bottling operations.

The tendency of polyester beverage containers to crack or craze is promoted by the presence of a number of common lubricating materials in contact with a substantial proportion of the surface of a polyester beverage container under pressure. The stress arises during manufacture of the polyester bottle from a preform. The stress is locked into the beverage container during manufacture and is often relieved as the lubricant materials contact the bottle. Lubricant materials appear to promote movement of the polyester molecules with respect to each other, relieving stress and leading to the creation of stress cracking. We have found that the degree of stress cracking is attributable, at least in part, to the amount of surface area of the bottle contacted by the lubricant. We have found in our experimentation that limiting the amount of surface area of the bottle that comes in contact with the lubricant can substantially improve the degree of stress cracking that occurs in the bottle material. Clearly, a substantial need exists to develop lubricating methods that result in the minimum amount of lubricant contact with the surface of the food container.

SUMMARY OF THE INVENTION

We have found that the problems inherent in conventional aqueous lubrication of conveyor systems used in food packaging and beverage bottling can be substantially improved using a continuous thin film lubricant layer formed on a conveyor surface. The lubricant layer is maintained at a thickness of less than about 3 millimeters, preferably about 0.0001 to 2 mm, with an add on of lubricant on the surface of less than about 0.05 gms-in$^{-2}$, preferably about $5\times10^{-4}$ to 0.02 gms-in$^{-2}$, most preferably about $2\times10^{-4}$ to 0.01 gms-in$^{-2}$. Such a thin lubricating film of the lubricant on the conveyor provides adequate lubrication to the conveyor system but ensures that the lubricant cannot foam, does not flow from the conveyor surface and contacts the absolute minimum surface area of the food container such as the beverage bottle as possible. Such a thin film lubricant maintains significant lubrication while avoiding waste of the lubricant composition and avoiding stress cracking promotion. We have found that the preferred mode of formation of the liquid lubricant compositions of the invention are in the form of an aqueous oil emulsion wherein the aqueous phase comprises about 10 to 50 wt % of the lubricant. The form of the emulsion can be either water in oil or oil in water emulsion. One preferred format of the emulsion is a phase unstable emulsion such that the emulsion separates forming an oil layer on top of a water layer which is then, in turn, contact with the conveyor surface. The methods of the invention can be used to convey virtually any food container on a conveyor line, but is particularly adapted to transporting both steel and aluminum cans and thermoplastic beverage containers such as polyethylene terephthalate beverage containers. Common PET beverage containers are formed with a pentaloid base having a five lobed structure in the base to provide stability to the bottle when it is placed on a surface. The contact with the lubricant on the pentaloid base must be minimized. We have found that using a thin film of emulsion lubricant, that less than about 10 to 300 mm$^2$, preferably 20 to 200 mm$^2$ of the surface of the bottle is contacted with lubricant. Certainly, the height of the lubricant in contact with the bottle is less than 3 millimeters. The motion of the conveyor, the tendency of the bottles to rock or move while being conveyed and the other aspects of relative movement at the bottle conveyor interface affect the height of the lubricant on the bottle. The methods of this invention are primarily directed to conveyor operations and do not involve any change in shape of the container arising from forming operations. The desirable coefficient of friction of the conveyor lubricant is about 0.1 to about 0.14.

The present invention provides in one aspect a container or conveyor for containers whose surface is coated at least in part with a thin, substantially non-dripping layer of a water-based cleaning agent-removable lubricant.

The invention also provides a process for lubricating a container, comprising applying to at least a part of the surface of the container a thin, substantially non-dripping layer of a water-based cleaning agent-removable lubricant.

The invention also provides a process for lubricating a conveyor system used to transport containers, comprising applying a thin, substantially non-dripping layer of a water-based cleaning agent-removable, substantially non-aqueous lubricant to a conveying surface of a conveyor, and then moving containers, such as beverage containers, on the conveyor.

The compositions used in the invention can be applied in relatively low amounts and with relatively low or no water content, to provide thin, substantially non-dripping lubricating films. In contrast to dilute aqueous lubricants, the lubricants of the invention provide drier lubrication of the conveyors and containers, a cleaner conveyor line and reduced lubricant usage, thereby reducing waste, cleanup and disposal problems.

Further features and advantages of the invention will become apparent from the detailed description that follows.

DETAILED DESCRIPTION OF PREFERRED EMBODIMENTS

Figure 1:
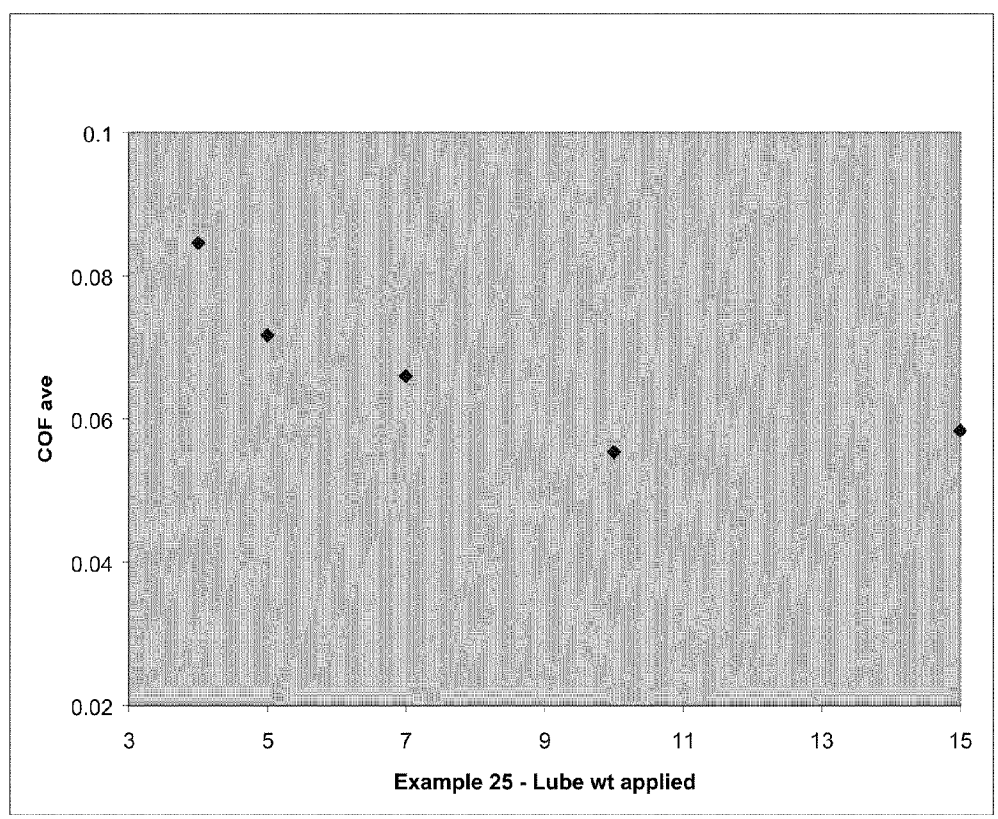
FIG. 1 is a graphical representation of the friction data arising from the testing done with the Lubricant of Example 25.

The present invention uses a thin, substantially non-dripping layer of a water-based cleaning agent-removable, substantially non-aqueous lubricant to lubricate containers and conveyor systems upon which the containers travel. By "substantially non-dripping", we mean that the majority of the lubricant remains on the container or conveyor following application until such time as the lubricant may be deliberately washed away. By "water-based cleaning agent-removable", we mean that the lubricant is sufficiently soluble or dispersible in water so that it can be removed from the container or conveyor using conventional aqueous cleaners, without the need for high pressure or mechanical abrasion. The phrase "substantially non-aqueous" means the lubricant is non-aqueous, includes water only as an impurity, or includes an amount of water that does not render the lubricant substantially non-dripping. When water is present in the lubricant, the amount of water preferably is less than about 50%, more preferably less than about 40% and most preferably about 5 to about 50% by weight based on the weight of the lubricant.

A variety of materials can be employed to prepare the lubricated containers and conveyors of the invention, and to carry out the processes of the invention. For example, the lubricant can contain various natural lubricants, petroleum lubricants, synthetic oils and greases. Examples of natural lubricants include vegetable oils, fatty oils, animal fats, and others that are obtained from seeds, plants, fruits, and animal tissue. Examples of petroleum lubricants include mineral oils with various viscosities, petroleum distillates, and petroleum products. Examples of synthetic oils include synthetic hydrocarbons, organic esters, poly(alkylene glycol)s, high molecular weight alcohols, carboxylic acids, phosphate esters, perfluoroalkylpolyethers (PFPE), silicates, silicones such as silicone surfactants, chlorotrifluoroethylene, polyphenyl ethers, polyethylene glycols, oxypolyethylene glycols, copolymers of ethylene and propylene oxide, and the like. Examples of useful solid lubricants include molybdenum disulfide, boron nitride, graphite, silica particles, silicone gums and particles, polytetrafluoroethylene (PTFE, Teflon), fluoroethylene-propylene copolymers (FEP), perfluoroalkoxy resins (PFA), ethylene-chloro-trifluoroethylene alternating copolymers (ECTFE), poly(vinylidene fluoride) (PVDF), and the like. The lubricant composition can contain an effective amount of a water-based cleaning agent-removable solid lubricant based on the weight of the lubricant composition. The lubricant composition can also contain a solid lubricant as a suspension in a substantially non-aqueous liquid. In such a situation, the amount of solid lubricant can be about 0.1 to 50 weight percent, preferably 0.5 to 20 percent by weight, based on the weight of the composition. Also, the solid lubricant can be used without a liquid. In such a situation, the amount of solid lubricant can be from about 50 to about 100 weight percent, preferably from about 80 to about 98 percent by weight, based on the weight of the composition.

Specific examples of useful lubricants include oleic acid, corn oil, mineral oils available from Vulcan Oil and Chemical Products sold under the "Bacchus" trademark; fluorinated oils and fluorinated greases, available under the trademark "Krytox" from is DuPont Chemicals. Also useful are siloxane fluids available from General Electric silicones, such as SF96-5 and SF 1147 and synthetic oils and their mixture with PTFE available under the trademark "Super Lube" from Synco Chemical. Also, high performance PTFE lubricant products from Shamrock, such as nanoFLON M020™, FluoroSLIP™ 225 and Neptune™ 5031 and polyalkylene glycols from Union Carbide such as UCON™ LB625, and Carbowax™ materials are useful.

The lubricants can be water-soluble but are preferably water-dispersible. In such cases, the lubricant can be easily removed from the container, if desired, by, for example, treatment with water. The lubricant, whether water-soluble or dispersible or not, is preferably easily removable from the container, conveyor and/or other surfaces in the vicinity, with common or modified detergents, for example, including one or more of surfactants, an alkalinity source, and water-conditioning agents. Useful water-soluble or dispersible lubricants include, but are not limited to, polymers of one or more of ethylene oxide, propylene oxide, methoxy polyethylene glycol, or an oxyethylene alcohol. Preferably the lubricant is compatible with the beverage intended to be filled into the container.

While many substantially non-aqueous lubricants are known per se, they have not been previously known or suggested to be used in the container or beverage container industries as described in this application. In certain embodiments, it is preferred that the lubricant is other than a (i) organic polymer, or other than a (ii) fluorine-containing polymer, or other than (iii) PTFE. In these embodiments, if (i), (ii) or (iii) is desired to be used, it can be used in combination with another lubricant.

The substantially non-aqueous lubricant used in the present invention can be a single component or a blend of materials from the same or different type of class of lubricant. Any desired ratio of the lubricants can be used so long as the desired lubricity is achieved. The lubricants can be in the form of a fluid, solid, or mixture of two or more miscible or non-miscible components such as solid particles dispersed in a liquid phase.

Also, a multistep process of lubricating can be used. For example, a first stage of treating the container and/or conveyor with a substantially non-aqueous lubricant and a second stage of treating with another lubricant, such as a substantially non-aqueous lubricant or an aqueous lubricant can be used. Any desired aqueous lubricant can be used, such as water. Any desired substantially non-aqueous lubricant can be used in the first or second stage. The lubricant of the second stage can be solid or liquid. By selection of appropriate first and second stages, desired lubrication can be provided. Also, the order of the second stage and first stage can be switched to give desired lubrication.

In addition to the lubricant, other components can be included with the lubricant to provide desired properties. For example, antimicrobial agents, colorants, foam inhibitors or foam generators, PET stress cracking inhibitors, viscosity modifiers, friction modifiers, antiwear agents, oxidation inhibitors, rust inhibitors, extreme pressure agents, detergents, dispersants, foam inhibitors, film forming materials and/or surfactants can be used, each in amounts effective to provide the desired results.

Examples of useful antiwear agents and extreme pressure agents include zinc dialkyl dithiophosphates, tricresyl phosphate, and alkyl and aryl disulfides and polysulfides. The antiwear and/or extreme pressure agents are used in amounts to give desired results. This amount can be from 0 to about 20 weight percent, preferably about 1 to about 5 weight percent for the individual agents, based on the total weight of the composition.

Examples of useful detergents and dispersants include alkylbenzenesulfonic acid, alkylphenols, carboxylic acids, alkylphosphonic acids and their calcium, sodium and magnesium salts, polybutenylsuccinic acid derivatives, silicone surfactants, fluorosurfactants, and molecules containing polar groups attached to an oil-solubilizing aliphatic hydrocarbon chain. The detergent and/or dispersants are used in an amount to give desired results. This amount can range from 0 to about 30, preferably about 0.5 to about 20 percent by weight for the individual component, based on the total weight of the composition.

Useful antimicrobial agents include disinfectants, antiseptics and preservatives. Non-limiting examples of useful antimicrobial agents include phenols including halo- and nitro-phenols and substituted bisphenols such as 4-hexylresorcinol, 2-benzyl-4-chlorophenol and 2,4,4'-trichloro-2'-hydroxydiphenyl ether, organic and inorganic acids and its esters and salts such as dehydroacetic acid, peroxycarboxylic acids, peroxyacetic acid, methyl p-hydroxy benzoic acid, cationic agents such as quaternary ammonium compound, aldehydes such as glutaraldehyde, antimicrobial dyes such as is acridines, triphenylmethane dyes and quinones and halogens including iodine and chlorine compounds. The antimicrobial agents can be used in an amount sufficient to provide desired antimicrobial properties. For example, from 0 to about 20 weight percent, preferably about 0.5 to about 10 weight percent of antimicrobial agent, based on the total weight of the composition can be used.

Examples of useful foam inhibitors include methyl silicone polymers. Non-limiting examples of useful foam generators include surfactants such as non-ionic, anionic, cationic and amphoteric compounds. These components can be used in amounts to give the desired results.

Viscosity modifiers include pour-point depressants and viscosity improvers such as polymethacrylates, polyisobutylenes and polyalkyl styrenes. The viscosity modifier is used in amount to give desired results, for example, from 0 to about 30 weight percent, preferably about 0.5 to about 15 weight percent, based on the total weight of the composition.

A layer of solid lubricant can be formed as desired, for example, by curing or solvent casting. Also, the layer can be formed as a film or coating or fine powder on the container and/or conveyor, without the need for any curing containers, including polyethylene terephthalate containers, polymer laminates, and metal containers, such as aluminum cans, papers, treated papers, coated papers, polymer laminates, ceramics, and composites can be treated.

By container is meant any receptacle in which material is or will be held or carried. For example, beverage or food containers are commonly used containers. Beverages include any liquid suitable for drinking, for example, fruit juices, soft drinks, water, milk, wine, artificially sweetened drinks, sports drinks, and the like. The lubricant should generally be non-toxic and biologically acceptable, especially when used with food or beverage containers.

The present invention is advantageous as compared to prior aqueous lubricants because the substantially non-aqueous lubricants have good compatibility with PET, superior lubricity, low cost because large amounts of water are not used, and allow for the use of a dry working environment. Moreover, the present invention reduces the amount of microbial contamination in the working environment, because microbes generally grow much faster in aqueous environments, such as those from commonly used aqueous lubricants.

The lubricant can be applied to a conveyor system surface that comes into contact with containers, the container surface that needs lubricity, or both. The surface of the conveyor that supports the containers may comprise fabric, metal, plastic, elastomer, composites, or mixture of these materials. Any type of conveyor system used in the container field can be treated according to the present invention.

Spraying, wiping, rolling, brushing, atomizing or a combination of any of these methods can be used to apply the liquid lubricant to the conveyor surface and/or the container surface. If the container surface is coated, it is only necessary to coat the surfaces that come into contact with the conveyor, and/or that come into contact with other containers.

Similarly, only portions of the conveyor that contacts the containers need to be treated. The lubricant can be a permanent coating that remains on the containers throughout its useful life, or a semi-permanent coating that is not present on the final container.

EXAMPLES

The invention can be better understood by the following examples. These examples are for illustration purposes only, and do not limit the scope of the invention.

In the examples, lubricity was measured as follows:
Lubricity Test Procedure:

Lubricity test was done by measuring the drag force (frictional force) of a weighted cylinder riding on a rotating disc, wetted by the testing sample. The material for the cylinder is chosen to coincide with the container materials, e.g., glass, PET, or aluminum. Similarly, the material for the rotating disc is the same as the conveyor, e.g., is stainless steel or plastics. The drag force, using an average value, is measured with a solid state transducer, which is connected, to the cylinder by a thin flexible string. The weight of the cylinder made from the same material is consistent for all the measurements.

The relative coefficient of friction (Rel COF) is calculated and used, where: Rel COF=COF (sample)/COF (reference)= drag force (sample)/drag force (reference).

Two commercially available aqueous-based lubricants for beverage conveyors were used as reference at recommended use dosage. They are reference 1=LUBODRIVE™ RX and reference 2=Lubri-Klenz™ LF; both are manufactured by Ecolab.

A Rel COF lower than 1 indicates a better lubricant than the reference. A good lubricant would have a typical Rel COF of less than 1.2, while a value greater than 1.4 would indicate a poor lubricant.

The lubricity results of some non-aqueous based lubricants were tested and are shown below. The lubricity measurement was carried out with the method described above. All the tests were using 100% of the stated materials or as indicated. The materials were either added or wiped onto the disc surface to result in a continuous film. The references were aqueous based lubricants and tested at 0.1% of conc. by weight in water for comparison. The test was run for several minutes until the force leveled off. The average drag force was recorded and the Rel COF was calculated based on the average drag forces of the testing sample and the reference.

Example 1-3

These examples demonstrated that corn oil, a natural oil, possesses lubricities which are better than or comparable to a commercially available aqueous based lube.

The cylinder material was mild steel for Example 1, glass for Example 2, and PET for Example 3. The rotating disk was stainless steel for Example 1-3.

|  | EXAMPLE 1 Mild steel-on stainless steel lubricity | | EXAMPLE 2 Glass-on stainless steel lubricity | | EXAMPLE 3 PET-on stainless steel lubricity | |
| --- | --- | --- | --- | --- | --- | --- |
|  | Corn oil | Refer. 1 | Corn oil | Refer. 1 | Corn oil | Refer. 1 |
| Drag force (average) (g) | 21.0 | 35.1 | 25.3 | 26.1 | 25.7 | 36.0 |
| Rel COF | 0.598 | 1.000 | 0.969 | 1.000 | 0.714 | 1.000 |

Example 4-6

These examples demonstrated that Bacchus™ 22, a mineral oil, possesses lubricities which are better than the commercially available aqueous based lube. The cylinder material was mild steel for Example 4, glass for Example 5, and PET for example 6. The rotating disk was stainless steel for Example 4-6.

|  | EXAMPLE 4 Mild steel-on stainless steel lubricity | | EXAMPLE 5 Glass-on stainless steel lubricity | | EXAMPLE 6 PET-on stainless steel lubricity | |
| --- | --- | --- | --- | --- | --- | --- |
|  | Bacchus 22 | Refer. 1 | Bacchus 22 | Refer. 1 | Bacchus 22 | Refer. 1 |
| Drag force (average) (g) | 10.2 | 31.3 | 22.4 | 27.6 | 18.6 | 31.1 |
| Rel COF | 0.326 | 1.000 | 0.812 | 1.000 | 0.598 | 1.000 |

Example 7-8

These examples demonstrated that the two synthetic lubricants have a mild steel-on-stainless steel lubricity that is better than or comparable to the commercially available aqueous based lube. The cylinder material was mild and the rotating disk was stainless steel.

|  | EXAMPLE 7 Krytox GPL 100 | EXAMPLE 8 Krytox GPL 200 | Reference 1 |
| --- | --- | --- | --- |
| Drag force (average) (g) | 15.1 | 34.3 | 35.0 |
| Rel COF | 0.431 | 0.980 | 1.000 |

Example 9

This example demonstrated that SF96-5, a synthetic siloxane lubricant, has a PET-on stainless steel lubricity that is better than the commercially available aqueous based lube. The cylinder material was PET and the rotating disk was stainless steel.

|  | SF96-5 | Reference 1 |
|---|---|---|
| Drag force (average) (g) | 27.6 | 35.1 |
| Rel COF | 0.786 | 1.000 |

Example 10

This example demonstrated that Krytox™ DF50, a solid lubricant in a solvent, possesses a mild steel-on stainless steel-lubricity that is comparable to the commercially available aqueous based lube. The cylinder material was mild steel and the rotating disk was stainless steel.

|  | Krytox DF50 | Reference 1 |
|---|---|---|
| Drag force (average) (g) | 35.7 | 35.0 |
| Rel COF | 1.020 | 1.000 |

The sample was applied to the disc surface then the coating was wiped with an isopropanol-wetted towel and air dried to result in a very thin, smooth coating.

Example 11-12

These examples demonstrated that behenic acid, a dry solid lubricant possesses a mild steel-on-stainless steel and glass-on-stainless steel lubricities which are comparable to a second commercially available aqueous based lube.

|  | EXAMPLE 11 Mild steel-on stainless steel lubricity | | EXAMPLE 12 Glass-on stainless steel lubricity | |
|---|---|---|---|---|
|  | Behenic acid | Reference 2 | Behenic acid | Reference 2 |
| Drag force (average) (g) | 30.0 | 28.0 | 28.0 | 28.0 |
| Rel COF | 1.071 | 1.000 | 1.000 | 1.000 |

0.1% behenic acid in ethanol was applied to the stainless steel rotating disc. A thin dry film was formed after the solvent evaporation.

Example 13

This example demonstrated that the Super lube oil with PTFE possesses a mild steel-on-stainless steel lubricity that is better than the commercially available aqueous based lube. The rotating disk was stainless steel.

|  | Super lube oil with PTFE | Reference 1 |
|---|---|---|
| Drag force (average) (g) | 27.9 | 33.2 |
| Rel COF | 0.840 | 1.000 |

Example 14-15

These examples demonstrated that the mixture of oleic acid and Krytox GPL100 possesses mild steel-on-stainless steel and PET-on-stainless steel lubricities, which are better than the commercially available aqueous based lube. The ratio of oleic acid to Krytox GPL100 is about 1:1 by weight. The rotating disk was stainless steel.

|  | EXAMPLE 14 Mild steel-on stainless steel lubricity | | EXAMPLE 15 PET-on stainless steel lubricity | |
|---|---|---|---|---|
|  | Oleic acid/ Krytox GPL100 (1:1) | Reference 1 | Oleic acid/ Krytox GPL100 (1:1) | Reference 1 |
| Drag force (average) (g) | 17.1 | 33.7 | 21.4 | 35.7 |
| Rel COF | 0.507 | 1.000 | 0.599 | 1.000 |

Example 16-17

These examples demonstrate that the mineral oil, Bacchus 68 and its mixture with an antimicrobial agent, IRGASAN™ DP300 (2,4,4'-trichloro-2'-hydroxy-diphenyl-ether, obtained from Ciba Specialty Chemicals) possess a superior PET stress cracking resistance.

PET Bottle Stress Cracking Test:

31.0 g of sodium bicarbonate and 31.0 g of citric acid were added to a 2-liter PET bottle (manufactured by Plastipak) containing 1850 g of chilled water and the bottle was capped immediately. The charged bottle was then rinsed with DI water and set on clear paper towel overnight.

Two testing liquids were prepared. Bacchus 68 was used as such as supplied. Bacchus 68+0.2% Irgasan DP300 was made by dissolving 1.0 g of Irgasan DP300 in 500 g of Bacchus 68 to result in a clear solution.

The base of the charged bottle was dipped into the testing liquid for 2-3 seconds then the bottle was placed in a plastic bag. The bottle with the bag was set in a bin and aged at 37.8° C. and 90% humidity for 15 days. Four bottles were used for each testing liquid. The bottle was examined several times during the aging for bursting.

After the aging, the base of the bottle was cut off and examined for crazing and cracking. The results are listed in the table below.

The grading is based on a scale of A-F as:

A: No signs of crazing to infrequent small, shallow crazes.

B: Frequent small, shallow to infrequent medium depth crazes which can be felt with a fingernail.

C: Frequent medium depth to infrequent deep crazes.

D: Frequent deep crazes.

F: Cracks, bottle burst before end of the 15 day testing.

| PET STRESS CRACKING GRADING | | |
|---|---|---|
| | EXAMPLE 16 | EXAMPLE 17 |
| Testing Liquid | Bacchus 68 | Bacchus 68 + 0.2% Irgasan DP300 |
| Bottle 1 | B | B |
| Bottle 2 | B | B |
| Bottle 3 | B | B |
| Bottle 4 | B | B |

Example 18

This example demonstrates that the mineral oil, Bacchus 68 possesses a higher PET stress cracking resistance in contrast to the aqueous based beverage conveyor is lubricant, Lubodrive RX at a possible use dosage for conveyor lubrication.

The experimental procedure was the same as described in example 16-17 except that the testing liquid for Lubrodrive RX was 0.75% by weight in DI water. The charged bottle was placed in the plastic bag that contained 100 g of the diluted Lubodrive RX. Also the experimental was carried out in the environmental oven at 37.8° C. and 90% humidity for 13 days instead of 15 days.

The results showed that Bacchus 68 caused less stress cracking than the Lubodrive RX at 0.75%.

Example 19-20

Example 19 demonstrates that the mineral oil, Bacchus 68, did not support the microbial growth, but killed the microbial in contrast to the commercially available beverage lube, Dicolube™ PL, manufactured by Diversey-Lever. Example 20 demonstrates that with the addition of the antimicrobial, methyl Paraben, to the mineral oil, the killing efficiency for the short time exposure was enhanced.

The Rate of Kill Antimicrobial Efficiency Test was carried out according to the method described below:

The bacteria, *staphylococus aureus* ATCC6538 and *enterobacter aerogenes* ATCC 13048, were transferred and maintained on nutrient agar slants. Twenty-four hours prior to testing, 10 mls of nutrient broth was inoculated with a loopful of each organism, one tube each organism. The inoculated nutrient broth cultures were incubated at 37° C. Shortly before testing, equal volumes of both incubated cultures were mixed and used as the test inoculum.

For Dicolube PL, the lube was diluted to 0.5% wt with soft water. One ml of the inoculant was combined with 99 mls of the lubricant solution and swirled. For oil-based lube, equal volumes of organisms were centrifuged at 9000 rpm 20° C. for 10 minutes, then decanted and re-suspended in an equivalent volume of the mineral oil.

A one ml sample of the lubricant/inoculum mixture was removed after 5 minute exposure time and added to 9 mls of a sterile D/E neutralizing broth. The neutralized sample was serially diluted with buffered water and plated in duplicate using D/E neutralizing agar. The procedure was repeated after 15 and 60 minutes exposure times. The plates were incubated at 37° C. for 48 hours then examined.

Controls to determined initial inoculum were prepared by adding one ml of inoculum to 9% mls of buffered water, serially diluting the mixture with additional buffered water, and plating with TGE.

The % reduction and log reduction were calculated as:

% Reduction=[(# of initial inoculum−# of survivors)/(# of initial inoculum)]×100 where: # of initial inoculum=$3.4 \times 10^6$ CFU/ml
CFU/ml: Colony forming units/ml Log Reduction=[$\log_{10}$(initial inoculum CFU/ml)]−[$\log_{10}$(survivors inoculum CFU/ml)]

The table showed the results of Rate of Kill Test:

| | EXAMPLE 19 Bacchus 68 | | | EXAMPLE 20 Bacchus 68 w 0.05% methyl Paraben* | | | COMPARISON EXAMPLE Dicolube PL | | |
|---|---|---|---|---|---|---|---|---|---|
| Test Concentration | 100% | | | 100% | | | 0.5% in DI water | | |
| | No. of survivors | Reduction | | No. of survivors | Reduction | | No. of survivors | Reduction | |
| Exposure time | CFU/ml | Log | Percent | CFU/ml | Log | Percent | CFU/ml | Log | Percent |
| 5 minutes | $2.4 \times 10^5$ | 1.15 | 92.941 | $8.6 \times 10^4$ | 1.60 | 97.470 | $3.5 \times 10^6$ | NR** | NR |
| 15 minutes | $2.3 \times 10^5$ | 1.17 | 93.235 | $4.3 \times 10^4$ | 1.90 | 98.735 | $3.6 \times 10^6$ | NR | NR |
| 60 minutes | $2.8 \times 10^5$ | 2.08 | 99.176 | $3.2 \times 10^4$ | 2.03 | 99.059 | $3.0 \times 10^6$ | 0.05 | 11.765 |

*Methyl Paraben: methyl 4-hydroxybenzoate, obtained 5 Chemicals Ltd.
**NR: No reduction Examples 21-22

These examples demonstrate that behenic acid, a dry solid lubricant, in combination with a liquid lubricant provides a mild steel-on-stainless steel and glass-on stainless steel lubricities which are better than or comparable to the second commercially available aqueous based lube.

| | EXAMPLE 21 Mild steel-on stainless steel lubricity | | EXAMPLE 22 Glass-on stainless steel lubricity | |
|---|---|---|---|---|
| | Behenic acid, then H$_2$O | Reference 2 | Behenic acid, then +H$_2$0 | Reference 2 |
| Drag force (average) (g) | 26.0 | 28.0 | 25.0 | 28.0 |
| Rel COF | 0.929 | 1.000 | 0.893 | 1.000 |

0.1% behenic acid in ethanol was applied to the stainless steel disc, a thin dry film was formed after the solvent evaporation. H$_2$0 was then applied to the surface of the dry film coated disc for the lubricity measurement.

The following table describes materials used in the above examples.

| LUBRICANT MATERIAL/TRADE-NAME | MATERIAL INFORMATION | VENDOR |
|---|---|---|
| Bacchus 22 | United States Pharmacopeia grade mineral oil | Vulcan Oil & Chemical Products |
| SF96-5 | Polydimethylsiloxane | GE silicones |
| Krytox GPL 100 | Perfluoropolyether | DuPont |
| Krytox GPL 200 | Perfluoropolyether mixed with FIFE (Polytetrafluoroethylene) | DuPont |
| Krytox DF 50 | Polytetrafluoroethylene in HCFC-14b | DuPont |
| Super lube oil with PTFE | Synthetic oil with PTFE | Synco Chemical |
| Oleic acid | Oleic acid | Henkel |
| Corn oil | Corn oil | |

Examples 23-27

These Examples use an oil in an aqueous emulsion and a glycerine stress cracking inhibitor and an optional surfactant.

Example 23

| Raw Material | % Weight |
|---|---|
| Glycerine (99.5% active) | 72.7 |
| Alkyl Poly Glyceride | 2 |
| Dow Corning HV495 Silicone Emulsion | 2 |
| DI Water | 23.3 |

Example 24

| Raw Material | % Weight |
|---|---|
| Glycerine (96% active) | 75.7 |
| Alkyl Poly Glyceride | 2 |
| Lambert E-2175 Silicone Emulsion | 2 |
| DI Water | 20.3 |

Example 25

| Raw Material | % Weight |
|---|---|
| Glycerine (96% active) | 77.24 |
| DI Water | 20.71 |
| Lambert E-2175 Silicone Emulsion | 2.05 |

Example 26

| Raw Material | % Weight |
|---|---|
| Glycerine (96% active) | 77.95 |
| DI Water | 20.1 |
| Mineral Seal Oil (White Oil) | 4.95 |

Example 27

| Raw Material | % Weight |
|---|---|
| Glycerin (96% active) | 77.24 |
| DI Water | 20.71 |
| Mineral Seal Oil (White Oil) | 2.05 |

The product of example 25 was tested for COF and the results are as follows:

| Lube (Ex. 25) Applied g | COF unitless parameter | Lube Applied g | Lub per unit area g · sq In |
|---|---|---|---|
| 4 | 0.0846 | 4 | 0.002564 |
| 5 | 0.0717 | 5 | 0.003205 |
| 7 | 0.066 | 7 | 0.004487 |
| 10 | 0.0554 | 10 | 0.006410 |
| 15 | 0.0584 | 15 | 0.009615 |
| 20 | 0.0621 | 20 | 0.012821 |

Conveyor surface: 2 × 3.25" × 20 ft = 6.5" × 2012 = 1560 sq. In

Coefficient of friction (COF) measured on a short track conveyor system: The determination of lubricity of the lubricant was measured on a short track conveyor system. The conveyor was equipped with two belts from Rexnord. The belt was Rexnord LF (polyacetal) thermoplastic belt of 3.25" width and 20 ft long. The lubricant was applied to the conveyor surface evenly with a bottle wash brush. The conveyor system was run at a speed of 100 ft/min. Six 2 L bottles filled with beverage were stacked in a rack on the track with a total weight of 16.15 kg. The rack was connected to a strain gauge by a wire. As the belts moved, force was exerted on the strain gauge by the pulling action of the rack on the wire. A computer recorded the pull strength. The coefficient of friction (COF) was calculated on the basis of the measured force and the mass of the bottles and it was averaged from the beginning to the end of the run. The results of the testing of example 25 are shown in a graphical form in FIG. 1.

Applicants' invention can include aspects and embodiments, which are not herein specifically described. Accordingly this disclosure should not be read as being limited to the foregoing examples or preferred embodiments.

We claim:

1. A method of lubricating the interface between a container and a moving conveyor surface, in the substantial absence of foamed lubricant and lubricant runoff, the method comprising:
    (a) forming a continuous thin film of a liquid lubricant composition on a container contact surface of a conveyor; and (b) moving a container on the conveyor surface in order to transport the container from a first location to a second location, wherein the lubricant comprises a synthetic ester oil and an anionic surfactant.

2. The method according to claim 1 wherein the anionic surfactant is comprised of a phosphate ester.

3. The method of claim 1 wherein the lubricant is comprised of an emulsion of an organic phase and an aqueous phase.

4. The method of claim 3 wherein the emulsion is a composition stable to phase separation.

5. The method of claim 1 wherein the liquid lubricant is applied to the surface of the conveyor via spraying.

6. The method of claim 1 wherein the lubricant composition is formed in to a thin film in the absence of an inline dilution of the lubricant.

7. The method according to claim 1, additionally comprising cleaning said conveyor with a cleaning solution to remove the lubricant.

8. The method of claim 1 wherein the container is comprised of aluminum, thermoplastic, or glass.

9. A method of lubricating the interface between a container and a moving conveyor surface, in the substantial absence of foamed lubricant and lubricant runoff, the method comprising:
(a) forming a continuous thin film of a liquid lubricant composition on a container contact surface of a conveyor; and
(b) moving a container on the conveyor surface in order to transport the container from a first location to a second location,
wherein the lubricant comprises a synthetic ester oil and a carboxylic acid.

10. The method of claim 9 wherein the lubricant is comprised of an emulsion of an organic phase and an aqueous phase.

11. The method of claim 10 wherein the emulsion is a composition stable to phase separation.

12. The method of claim 9 wherein the liquid lubricant is applied to the surface of the conveyor via spraying.

13. The method of claim 9 wherein the lubricant composition is formed in to a thin film in the absence of an inline dilution of the lubricant.

14. The method according to claim 9, additionally comprising cleaning said conveyor with a cleaning solution to remove the lubricant.

15. The method according to claim 9 wherein the carboxylic acid is comprised of oleic acid.

16. The method of claim 9 wherein the container is comprised of aluminum, thermoplastic, or glass.

17. A method of lubricating the interface between a container and a moving conveyor surface, in the substantial absence of foamed lubricant and lubricant runoff, the method comprising:
(a) forming a continuous thin film of a liquid lubricant composition on a container contact surface of a conveyor; and
(b) moving a container on the conveyor surface in order to transport the container from a first location to a second location,
wherein the lubricant comprises a synthetic hydrocarbon oil and an anionic surfactant.

18. The method according to claim 17 wherein the anionic surfactant is comprised of a phosphate ester.

19. The method of claim 17 wherein the lubricant is comprised of an emulsion of an organic phase and an aqueous phase.

20. The method of claim 19 wherein the emulsion is a composition stable to phase separation.

21. The method of claim 17 wherein the liquid lubricant is applied to the surface of the conveyor via spraying.

22. The method of claim 17 wherein the lubricant composition is formed in to a thin film in the absence of an inline dilution of the lubricant.

23. The method according to claim 17, additionally comprising cleaning said conveyor with a cleaning solution to remove the lubricant.

24. The method of claim 17 wherein the container is comprised of aluminum, thermoplastic, or glass.

25. A method of lubricating the interface between a container and a moving conveyor surface, in the substantial absence of foamed lubricant and lubricant runoff, the method comprising:
(a) forming a continuous thin film of a liquid lubricant composition on a container contact surface of a conveyor; and
(b) moving a container on the conveyor surface in order to transport the container from a first location to a second location,
wherein the lubricant comprises a synthetic hydrocarbon oil and a carboxylic acid.

26. The method of claim 25 wherein the lubricant is comprised of an emulsion of an organic phase and an aqueous phase.

27. The method of claim 25 wherein the emulsion is a composition stable to phase separation.

28. The method of claim 25 wherein the liquid lubricant is applied to the surface of the conveyor via spraying.

29. The method of claim 25 wherein the lubricant composition is formed in to a thin film in the absence of an inline dilution of the lubricant.

30. The method according to claim 25 additionally comprising cleaning said conveyor with a cleaning solution to remove the lubricant.

31. The method according to claim 25 wherein the carboxylic acid is comprised of oleic acid.

32. The method of claim 25 wherein the container is comprised of aluminum, thermoplastic, or glass.

* * * * *